United States Patent
Yano et al.

(10) Patent No.: US 12,002,969 B2
(45) Date of Patent: Jun. 4, 2024

(54) METHOD FOR PRODUCING METAL NANOPARTICLES, METHOD FOR PRODUCING MEMBRANE ELECTRODE ASSEMBLY, AND METHOD FOR PRODUCING POLYMER ELECTROLYTE FUEL CELL

(71) Applicant: TOYOTA BOSHOKU KABUSHIKI KAISHA, Aichi (JP)

(72) Inventors: Hiroshi Yano, Aichi (JP); Tomotaka Saito, Aichi (JP); Kota Iwasaki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 105 days.

(21) Appl. No.: 17/211,140

(22) Filed: Mar. 24, 2021

(65) Prior Publication Data
US 2021/0305585 A1    Sep. 30, 2021

(30) Foreign Application Priority Data
Mar. 26, 2020 (JP) ................. 2020-055733

(51) Int. Cl.
*B22F 9/02* (2006.01)
*B22F 1/054* (2022.01)
(Continued)

(52) U.S. Cl.
CPC ............. *H01M 4/926* (2013.01); *B22F 1/054* (2022.01); *B22F 9/026* (2013.01); *B22F 9/24* (2013.01);
(Continued)

(58) Field of Classification Search
CPC .... H01M 4/8842; H01M 4/881; H01M 4/928; H01M 8/1004; H01M 8/1018; H01M 2008/1095; H01M 2300/0082; B05D 1/02; B22F 1/054; B22F 9/026; B22F 9/24; B22F 2301/054
(Continued)

(56) References Cited

U.S. PATENT DOCUMENTS 5,843,519 A * 12/1998 Tada ................... H01M 8/1004
427/115
7,255,954 B2  8/2007 Hampden-Smith et al.
(Continued)

FOREIGN PATENT DOCUMENTS

| JP | 56-155645 A | 12/1981 |
| JP | H03-229646 A | 10/1991 |

(Continued)

OTHER PUBLICATIONS

Office Action issued in JP Patent Application No. 2020-055733, Sep. 26, 2023, translation.

*Primary Examiner* — Brian K Talbot
(74) *Attorney, Agent, or Firm* — GREENBLUM & BERNSTEIN, P.L.C.

(57) ABSTRACT

Provided is a method for producing metal nanoparticles, which enables metal nanoparticles to be more conveniently produced.
The method for producing metal nanoparticles includes spraying and drying a mixture to form metal nanoparticles, the mixture containing a metal salt and at least one solvent selected from alcohols having 1 or more and 5 or less carbon atoms.

11 Claims, 10 Drawing Sheets

(51) Int. Cl.
  *B22F 9/24* (2006.01)
  *H01M 4/88* (2006.01)
  *H01M 4/92* (2006.01)
  *H01M 8/1004* (2016.01)
  *H01M 8/1018* (2016.01)
  *B05D 1/02* (2006.01)
  *H01M 8/10* (2016.01)

(52) U.S. Cl.
  CPC ......... *H01M 4/881* (2013.01); *H01M 4/8842* (2013.01); *H01M 4/928* (2013.01); *H01M 8/1004* (2013.01); *H01M 8/1018* (2013.01); *B05D 1/02* (2013.01); *B22F 2301/25* (2013.01); *B22F 2304/052* (2013.01); *B22F 2304/054* (2013.01); *H01M 2008/1095* (2013.01); *H01M 2300/0082* (2013.01)

(58) Field of Classification Search
  USPC .................................................. 427/115, 421
  See application file for complete search history.

(56) References Cited

U.S. PATENT DOCUMENTS

| | | | |
|---|---|---|---|
| 8,324,127 B2* | 12/2012 | Uchikawa | B01J 37/0248 |
| | | | 502/355 |
| 9,688,700 B2* | 6/2017 | Trukhan | C07F 3/003 |
| 2003/0198849 A1 | 10/2003 | Hampden-Smith et al. | |
| 2008/0090721 A1 | 4/2008 | Komoda | |
| 2008/0299431 A1* | 12/2008 | Lei | H01M 4/921 |
| | | | 429/431 |
| 2013/0310526 A1* | 11/2013 | Jorgensen | C08F 4/69 |
| | | | 502/320 |
| 2014/0038811 A1* | 2/2014 | Murakami | B01J 35/023 |
| | | | 502/262 |
| 2015/0243999 A1* | 8/2015 | Takahashi | H01M 4/9016 |
| | | | 429/482 |
| 2016/0372759 A1* | 12/2016 | Ueyama | B01J 23/42 |
| 2017/0100706 A1* | 4/2017 | Hass | B01J 35/006 |
| 2018/0175398 A1* | 6/2018 | Miyake | C01G 35/006 |
| 2018/0221862 A1* | 8/2018 | Baeissa | B01J 37/343 |
| 2020/0002799 A1* | 1/2020 | Hamaya | C01F 17/265 |
| 2022/0048015 A1* | 2/2022 | Snell | C10G 35/085 |

FOREIGN PATENT DOCUMENTS

| | | |
|---|---|---|
| JP | 2002-095969 A | 4/2002 |
| JP | 2006-508501 A | 3/2006 |
| JP | 2009-164142 | 7/2009 |
| JP | 2017-006809 A | 1/2017 |
| JP | 2017-508619 A | 3/2017 |
| JP | 2018-44245 | 3/2018 |
| KR | 10-2004-0104104 A | 12/2004 |
| WO | WO 2009072683 * | 6/2009 |

* cited by examiner

METHOD FOR PRODUCING METAL NANOPARTICLES, METHOD FOR PRODUCING MEMBRANE ELECTRODE ASSEMBLY, AND METHOD FOR PRODUCING POLYMER ELECTROLYTE FUEL CELL

CROSS-REFERENCE TO RELATED APPLICATION

The present disclosure relates to a method for producing metal nanoparticles, a method for producing a membrane electrode assembly, and a method for producing a polymer electrolyte fuel cell. This application is based on Japanese Patent Application No. 2020-55733 filed on Mar. 26, 2020, and claims the benefit of its priority, and the disclosure of the patent application is incorporated herein by reference in its entirety.

BACKGROUND OF THE INVENTION

Methods for preparing a metal nanoparticle catalyst used in a fuel cell or the like are classified broadly into dry methods and wet methods. Examples of the dry method include vacuum vapor deposition methods. The dry method has a small number of steps. However, the dry method involves a vacuum chamber etc., leading to expansion of equipment. In addition, the dry method gives a low yield, and is not suitable for industrial production. Thus, many of catalysts used or developed for fuel cells and the like are synthesized by wet methods. Examples of the wet method include methods as disclosed in JP 2018-44245 A and in JP 2009-164142 A. These wet methods enable a large amount of a metal nanoparticle catalyst to be synthesized at one time.

However, the wet method is disadvantageous in terms of production cost because there are a large number of steps and the steps are further complicated due to control of the shapes of nanoparticles. For example, in the method using a microemulsion dispersion as disclosed in JP-2018-44245 A and the method using an amphipathic polymer as disclosed in JP 2009-164142 A, platinum-group nanoparticles are formed while the particle diameter is controlled by using a dispersant. In these methods, it is easy to control the size of particles, but steps for removing remaining organic substances, i.e. steps of heat treatment and alcohol cleaning are essential. Thus, conventional methods have a large number of steps, and are disadvantageous in terms of production cost.

In addition, conventional methods for producing a membrane electrode assembly in a polymer electrolyte fuel cell and methods for producing a polymer electrolyte fuel cell including a membrane electrode assembly have a large number of steps, and are disadvantageous in terms of production cost.

For solving the above-described problems, an object of the present disclosure is to provide a more convenient method for producing metal nanoparticles, a more convenient method for producing a membrane electrode assembly, and a more convenient method for producing a polymer electrolyte fuel cell.

SUMMARY OF THE INVENTION

A method for producing metal nanoparticles, the method including spraying and drying a mixture to form metal nanoparticles, the mixture containing a metal salt and at least one solvent selected from alcohols having 1 or more and 5 or less carbon atoms.

This production method enables production of metal nanoparticles by a simplified method.

DETAILED DESCRIPTION

Other examples of the present disclosure will now be described.

There is provided a method for producing metal nanoparticles, in which the mixture further contains a support.

This production method enables convenient production of metal nanoparticles supported on the support.

There is provided a method for producing metal nanoparticles, in which the metal salt is reduced during drying of the mixture.

This production method enables production of metal nanoparticles by a simplified method.

There is provided a method for producing metal nanoparticles, in which the metal nanoparticles are produced in a gas atmosphere containing oxygen in an amount of 0 ppm or more and 50000 ppm or less.

This production method enables suppression of oxidizing reaction by oxygen.

There is provided a method for producing metal nanoparticles, in which the metal nanoparticles have an average particle diameter of 0.7 nm or more and less than 2 nm.

This production method enables production of metal nanoparticles having a small particle diameter.

There is provided a method for producing metal nanoparticles, the method including the steps of: forming a mixture by mixing a metal salt with at least one solvent selected from alcohols having 1 or more and 5 or less carbon atoms; and spraying the mixture, in which the mixture in the form of mist is dried, and the metal salt is reduced to form metal nanoparticles.

This production method enables production of metal nanoparticles by a simplified method.

There is provided a method for producing a membrane electrode assembly having a polymer electrolyte membrane and an electrode, the method including the step of forming the electrode containing the metal nanoparticles on a surface of the polymer electrolyte membrane by spraying a mixture of a metal salt, at least one solvent selected from alcohols having 1 or more and 5 or less carbon atoms, and a support to the polymer electrolyte membrane and drying the mixture to form the metal nanoparticles.

This production method enables production of a membrane electrode assembly by a simplified method. Hitherto, a catalyst prepared in advance has been sprayed to a polymer electrolyte membrane to form a membrane electrode assembly. That is, conventional methods require a step of producing a catalyst and a step of forming a catalyst layer (electrode). In the production method of the present disclosure, the step of spraying the mixture to the polymer electrolyte membrane and drying the mixture also serves as the step of producing a catalyst and the step of forming a catalyst layer (electrode), so that the membrane electrode assembly can be formed by a smaller number of steps.

There is provided a method for producing a polymer electrolyte fuel cell including a membrane electrode assembly having a polymer electrolyte membrane and an electrode, the method including the step of forming the electrode containing metal nanoparticles on a surface of the polymer electrolyte membrane by spraying a mixture of a metal salt, at least one solvent selected from alcohols having 1 or more and 5 or less carbon atoms, and a support to the polymer electrolyte membrane and drying the mixture to form the metal nanoparticles.

This production method enables production of a polymer electrolyte fuel cell by a simplified method. Hitherto, a catalyst prepared in advance has been sprayed to a polymer electrolyte membrane to form a catalyst layer (electrode). That is, conventional methods require a step of producing a catalyst and a step of forming a catalyst layer (electrode). In the production method of the present disclosure, the step of spraying the mixture to the polymer electrolyte membrane and drying the mixture also serves as the step of producing a catalyst and the step of forming a catalyst layer (electrode), so that the polymer electrolyte fuel cell can be formed by a smaller number of steps.

Embodiments of the present disclosure will be described in detail below. In the present description, the notation with "to" for the numerical range includes the lower limit value and the upper limit value unless otherwise specified. For example, the notation of "10 to 20" includes both the lower limit "10" and the upper limit "20". That is, the notation of "10 to 20" means "10 or more and 20 or less".

1. Method for Producing Metal Nanoparticles

The method for producing metal nanoparticles according to the present disclosure includes spraying and drying a mixture to form metal nanoparticles, the mixture containing a metal salt and at least one solvent selected from alcohols having 1 or more and 5 or less carbon atoms.

(1) Metal Salt

The metal contained in the metal salt is not particularly limited. The metal is preferably a noble metal in view of usefulness of the metal nanoparticles. The noble metal is not particularly limited, and it is preferable to use at least one selected from the group consisting of platinum (Pt), palladium (Pd), rhodium (Rh), gold (Au), silver (Ag), iridium (Ir) and ruthenium (Ru). Among these, at least one selected from the group consisting of Pt, Pd, Rh, Ir and Ru is more preferable, and at least one selected from the group consist-ing of Pt and Pd is still more further preferable from the viewpoint of catalyst performance.

The metal salt is preferably a noble metal salt. As the noble metal salt, at least one selected from hexachloroplatinic (IV) acid hexahydrate ($H_2PtCl_6·6H_2O$), tetraamminedichloroplatinum ($Pt(NH_3)_4Cl_2·xH_2O$), platinum bromide (IV) ($PtBr_4$) and bis (acetylacetonato) platinum (II) ($[Pt(C_5H_7O_2)_2]$) can be preferably used.

(2) Alcohol Having 1 to 5 Carbon Atoms

As the alcohol having 1 to 5 carbon atoms, at least one selected from the group consisting of methanol, ethanol, propanol, isopropyl alcohol, 1-butanol, 2-butanol, t-butyl alcohol, 1-pentanol and 3-pentanol can be preferably used. Among these, ethanol is preferable from the viewpoint of reducing the environmental load.

The amount ratio of the alcohol to the metal salt is not particularly limited. The concentration of the metal salt in an alcohol solution with the metal salt dissolved in the alcohol is not particularly limited. The concentration of the metal salt is preferably 0.1 $molL^{-1}$ or more and 50 $molL^{-1}$ or less, more preferably 5 $molL^{-1}$ or more and 40 $molL^{-1}$ or less, still more preferably 10 $molL^{-1}$ or more and 30 $molL^{-1}$ or less, from the viewpoint of forming metal nanoparticles having a particle diameter of 0.7 nm to 2 nm.

(3) Support

The mixture may further contain a support. The support is not particularly limited as long as it can support the metal nanoparticles. As the support, at least one or more of carbon black, amorphous carbon, carbon nanotubes, and carbon nanohorns; or one or more metal oxides selected from rare earths, alkaline earths, transition metals, niobium, bismuth, tin, antimony, zirconium, molybdenum, indium, tantalum and tungsten can be preferably used. Among these, carbon black is preferable from the viewpoint of the surface area.

When carbon black is used as the support, the nitrogen adsorption specific surface area of carbon black is not particularly limited. The nitrogen adsorption specific surface area of carbon black is preferably 10 $m^2 g^{-1}$ or more and 1800 $m^2 g^{-1}$ or less, more preferably 150 $m^2 g^{-1}$ or more and 800 $m^2 g^{-1}$ or less from the viewpoint of supporting metal nanoparticles.

(4) Mixing Ratio of Support to Alcohol

When a support is used, the mixing ratio of the support to the alcohol is not particularly limited. From the viewpoint of sufficiently blending the support with the alcohol to form metal nanoparticles having a particle diameter of 0.7 nm to 2 nm, the support is mixed in an amount of preferably 2 mg or more and 200 mg or less, more preferably 10 mg or more and 100 mg or less, still more preferably 30 mg or more and 80 mg or less, based on 1 mL of the alcohol.

(5) Mixing

The method for mixing in preparation of the mixture is not particularly limited. The support and the alcohol may be ground and mixed by using a mortar and a pestle, may be ground and mixed by using a dry mill such as a ball mill, a vibration mill, a hammer mill, a roll mill or a jet mill, or may be ground and mixed by using mixer such as a ribbon blender, a Henschel mixer or V-shaped blender. The mixing time is not particularly limited.

(6) Spraying

The method for spraying the mixture is not particularly limited. The mixture is sprayed by using, for example, a spray nozzle. The temperature of the mixture sprayed is not particularly limited. The temperature of the mixture is, for example, 10° C. or higher and 40° C. or lower from the viewpoint of maintaining the state of the substance. Metal nanoparticles are formed by spraying the mixture into the atmosphere. The atmospheric temperature during spraying is not particularly limited. The ambient temperature is preferably 10° C. or higher and 300° C. or lower, more preferably 15° C. or higher and 150° C. or lower, still more preferably 20° C. or higher and 100° C. or lower, from the viewpoint of drying the mixture into metal nanoparticles. The pressure of the atmosphere may be normal pressure (atmospheric pressure), reduced pressure or raised pressure.

The atmosphere is preferably a gas atmosphere containing oxygen in an amount of 0 ppm or more and 50000 ppm or less. In a gas atmosphere with a low oxygen concentration, undesired oxidation reaction is suppressed. Examples of the undesired oxidation reaction include oxidation reaction in which a support is oxidized by oxygen when the mixture contains the support. Specifically, the following oxidation reaction is suppressed. When a noble metal salt is used as the metal salt, noble metal nanoparticles are formed on the support. Here, when oxygen is present, the noble metal nanoparticles function as a catalyst, resulting in oxidation of the support. Thus, a gas atmosphere with a low oxygen concentration is preferable for suppressing such an oxidation reaction.

Preferably, the mixture is sprayed toward the target from the viewpoint of efficiently collecting the metal nanoparticles. The target functions as a scavenger which catches the metal nanoparticles. As the target, for example, a plate-shaped member is preferably used. As the plate-shaped member, a fluororesin plate is preferably used. The target may be heated. For heating, for example, a heater is used. The heating temperature for heating the target is not particularly limited. The heating temperature is, for example, 30° C. or higher and 100° C. or lower.

(7) Average Particle Diameter of Metal Nanoparticles

The average particle diameter of the metal nanoparticles is not particularly limited. The average particle diameter of the metal nanoparticles is preferably 0.7 nm or more and less than 2 nm, more preferably 1.2 nm or more and 1.6 nm or less, from the viewpoint of enhancing the function of the metal nanoparticles: for example, from the viewpoint of ensuring that the metal nanoparticles exhibit high activity when used as a catalyst.

The average particle diameter can be determined by the following method (method for determining the average particle diameter). The synthesized metal nanoparticles are observed by a transmission electron microscope (TEM). A TEM photograph is printed on paper, the metal nanoparticles (black circular image) are considered as being spherical, the distance between both ends of the metal nanoparticle is considered as a diameter, and a total of 300 particles are randomly measured in an image of several visual fields (3 to 5 visual fields). The average of the diameters of 300 metal nanoparticles counted is defined as an average particle diameter.

(8) Effect of Production Method of Embodiment

The production method of the embodiment enables production of metal nanoparticles by a very simple method in which a mixture (mixed solution) of a highly volatile alcohol (e.g. methanol or ethanol) and a metal salt is sprayed in a mist state, and dried. The production method is an environmentally friendly method which does not generate any waste liquid in the production process. In this production method, metal nanoparticles can be produced in just a few tens of seconds. Thus, the synthesis time, which should be several hours to several tens of hours in conventional methods, can be considerably reduced. Further, when a support material is mixed with the mixture, a support body with metal nanoparticles supported on a support can be prepared in just a few tens of seconds. The metal nanoparticles and the support body of the metal nanoparticles, which are produced by the production method, can be used for a wide range of purposes. Examples of the use purpose include use as electrode catalysts for polymer electrolyte fuel cells used as household or automotive power sources.

The production method of the embodiment is also used for producing a catalyst as described above, and is a completely new method which overturns the conventional concept of catalyst preparation. By carrying out the production method, the number of synthesis steps can be minimized. Therefore, with regard to, for example, fuel cells, the production method is an important invention relating to cost reduction, acceleration of widespread use of fuel cells themselves and widespread use of fuel cell vehicles and stationary cogeneration equipment using the fuel cells is highly expected.

Further, since the metal nanoparticles produced by the production method of the embodiment have an average particle diameter of 0.7 nm or more and less than 2 nm, the metal utilization rate is high at the atomic level, and high performance can be obtained.

2. Method for Producing Metal Nanoparticles

The method for producing metal nanoparticles of the present disclosure includes the steps of: preparing a mixture by mixing a metal salt and at least one solvent selected from an alcohol having 1 or more and 5 or less carbon atoms; and spraying the mixture. The mixture in the form of mist is dried, and the metal salt is reduced to form metal nanoparticles.

(1) Incorporated Descriptions

The above descriptions of "(1) Metal salts", "(2) Alcohol having 1 to 5 carbon atoms", "(5) Mixing", "(6) Spraying", "(7) Average particle diameter of metal nanoparticles" and "(8) Effect of production method of embodiment" as described in the above "1. Method for producing metal nanoparticles" are directly applied to the method for producing metal nanoparticles according to the present disclosure, and descriptions thereof are omitted.

In addition, in the present method for producing metal nanoparticles, the mixture may further contain a support, as in the above "1. Method for producing metal nanoparticles". For the "support" in this case, the above descriptions of "(3)

Support" and "(4) Mixing ratio of support and alcohol" in "1. Method for producing metal nanoparticles" are directly applied.

3. Method for Producing Membrane Electrode Assembly 18 and Method for Producing a Polymer Electrolyte Fuel Cell 10

Figure 10:
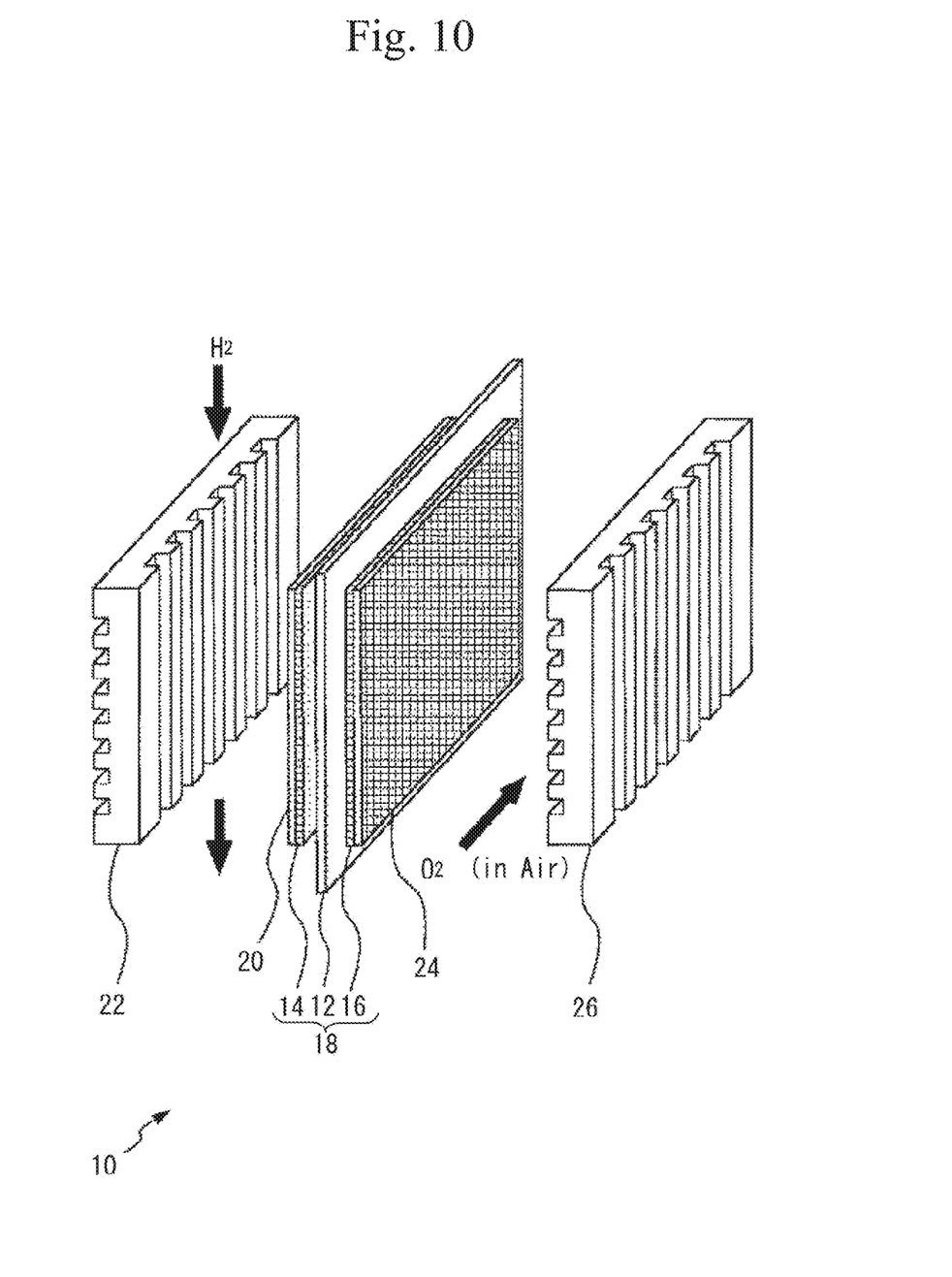
FIG. 10 is a schematic diagram of a cross-sectional configuration of an example of a polymer electrolyte fuel cell.

Here, first, the configuration of an example of the polymer electrolyte fuel cell 10 will be described. As shown in FIG. 10, the polymer electrolyte fuel cell 10 includes a polymer electrolyte membrane 12. The polymer electrolyte membrane 12 is formed of, for example, a perfluorosulfonic acid resin. On both sides of the polymer electrolyte membrane 12, an anode electrode 14 and a cathode electrode 16 are provided so as to sandwich the polymer electrolyte membrane 12. The polymer electrolyte membrane 12, a pair of the anode electrode 14 and the cathode electrode 16 which sandwich the polymer electrolyte membrane 12 form a membrane electrode assembly 18.

A gas diffusion layer 20 is provided on the outer side of the anode electrode 14. The gas diffusion layer 20 is formed of a porous material such carbon paper, carbon cloth, or a metal porous material, and has a function of uniformly diffusing a gas supplied from the separator 22 side to the anode electrode 14. Similarly, a gas diffusion layer 24 is provided on the outer side of the cathode electrode 16. The gas diffusion layer 24 has a function of uniformly diffusing a gas supplied from the separator 26 side to the cathode electrode 16. In this figure, only a set of the membrane electrode assembly 18, the gas diffusion layers 20 and 24 and the separators 22 and 26 configured as described above is shown, but the actual polymer electrolyte fuel cell 10 may have a stack structure in which a plurality of membrane electrode assemblies 18 and gas diffusion layers 20 and 24 are stacked with the separators 22 and 26 interposed therebetween.

The method for producing the membrane electrode assembly 18 includes the step of forming the electrode containing metal nanoparticles on a surface of the polymer electrolyte membrane 12 by spraying a mixture of a metal salt, at least one solvent selected from alcohols having 1 or more and 5 or less carbon atoms, and a support to the polymer electrolyte membrane 12 and drying the mixture to form the metal nanoparticles. In this production method, at least one of the anode electrode 14 and the cathode electrode 16 may be formed by spraying and drying the mixture. The other of the anode electrode 14 and the cathode electrode 16 may be formed by another method. Of course, both the anode electrode 14 and the cathode electrode 16 may be formed by spraying and drying the mixture.

The above descriptions of "(1) Metal salts", "(2) Alcohol having 1 to 5 carbon atoms", "(3) Support", "(4) Mixing ratio of support and alcohol", "(5) Mixing", "(6) Spraying", "(7) Average particle diameter of metal nanoparticles" and "(8) Effect of production method of embodiment" as described in the above "1. Method for producing metal nanoparticles" are directly applied to the method for producing the membrane electrode assembly 18 according to the present disclosure, and descriptions thereof are omitted.

The method for producing the polymer electrolyte fuel cell 10 relates to the polymer electrolyte fuel cell 10 including the membrane electrode assembly 18 having the polymer electrolyte membrane 12 and the electrodes 14 and 16. This production method includes the step of forming the electrode containing metal nanoparticles on a surface of the polymer electrolyte membrane 12 by spraying a mixture of a metal salt, at least one solvent selected from alcohols having 1 or more and 5 or less carbon atoms, and a support to the polymer electrolyte membrane 12 and drying the mixture to form the metal nanoparticles.

In this production method, at least one of the anode electrode 14 and the cathode electrode 16 may be formed by spraying and drying the mixture. The other of the anode electrode 14 and the cathode electrode 16 may be formed by another method. Of course, both the anode electrode 14 and the cathode electrode 16 may be formed by spraying and drying the mixture.

The above descriptions of "(1) Metal salts", "(2) Alcohol having 1 to 5 carbon atoms", "(3) Support", "(4) Mixing ratio of support and alcohol", "(5) Mixing", "(6) Spraying", "(7) Average particle diameter of metal nanoparticles" and "(8) Effect of production method of embodiment" as described in the above "1. Method for producing metal nanoparticles" are directly applied to the method for producing the polymer electrolyte fuel cell 10 according to the present disclosure, and descriptions thereof are omitted.

Example

The present disclosure will be described in more detail by way of an example.

1. Experiment 1

Figure 1:
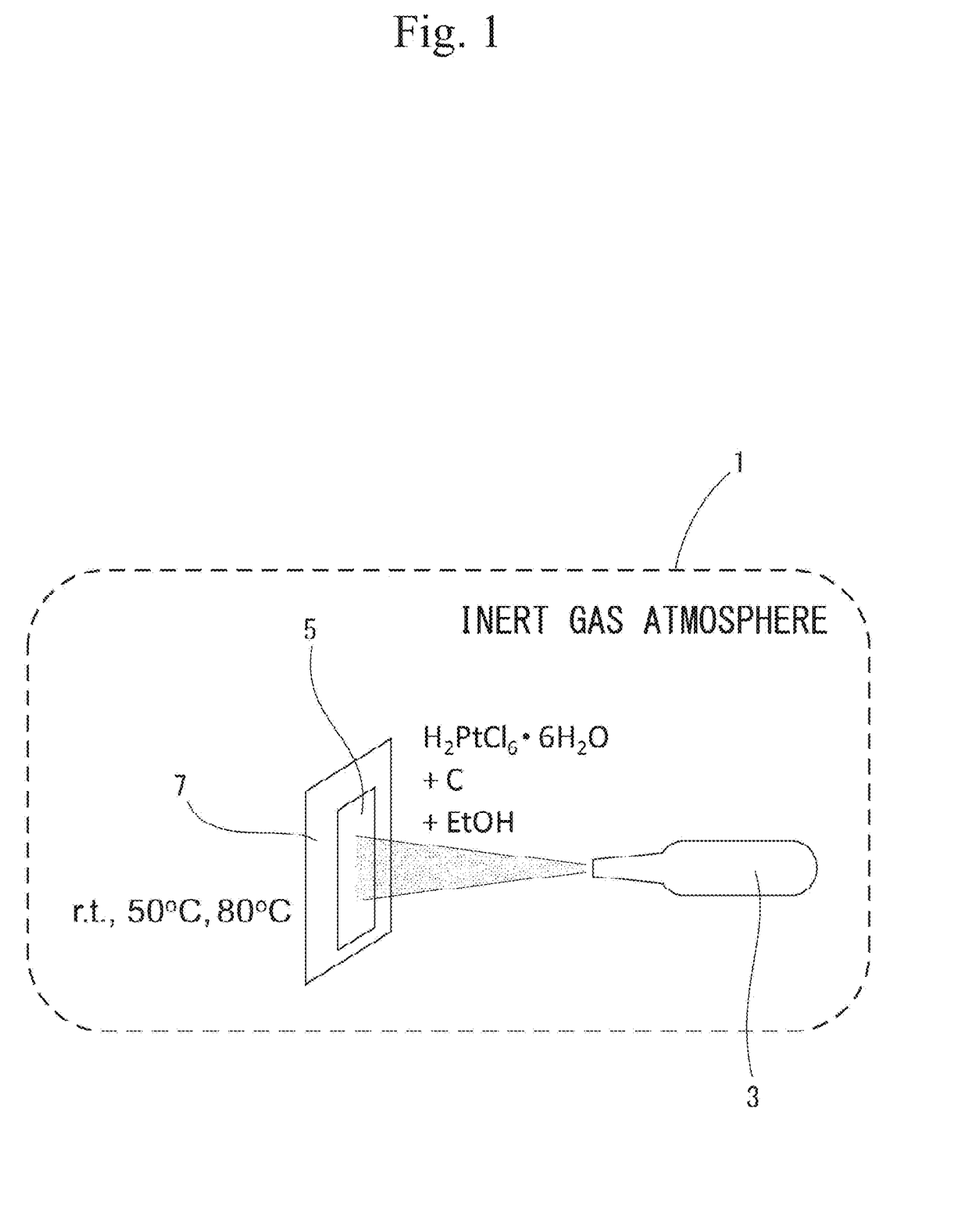
FIG. 1 is a conceptual diagram of an example of an apparatus for producing metal nanoparticles.

FIG. 1 shows an example of an apparatus for producing metal nanoparticles. All experiments were conducted in a glove box 1 whose atmosphere can be controlled. The inside of the glove box 1 had an argon gas atmosphere. A mixed liquid of 56 mg of hexachloroplatinic (IV) acid hexahydrate ($H_2PtCl_6 \cdot 6H_2O$; Kanto Chemical Co., Inc.; 98.5%), 80 mg of graphitized carbon black (GCB; specific surface area: 150 $m^2\ g^{-1}$: LION) and 10 mL of ethanol was prepared, and filled into a spray gun 3 in the glove box 1. A Teflon (registered trademark) sheet 5 was placed on a heater 7, and the sheet 5 was kept warm at room temperature (20° C.), 50° C. and 80° C. In each case, the mixed liquid was sprayed toward the sheet 5, and the state of the metal nanoparticles supported on the graphitized carbon black was observed.

Figure 2:
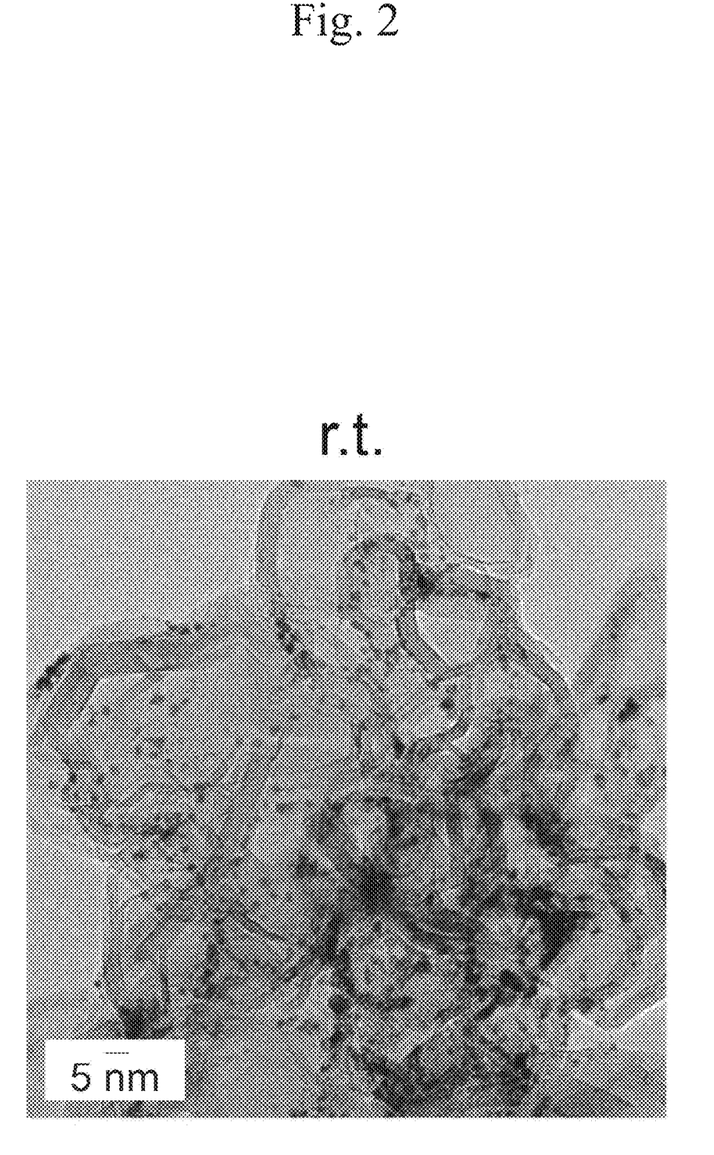
FIG. 2 shows a TEM image of metal nanoparticles synthesized at room temperature.
Figure 3:
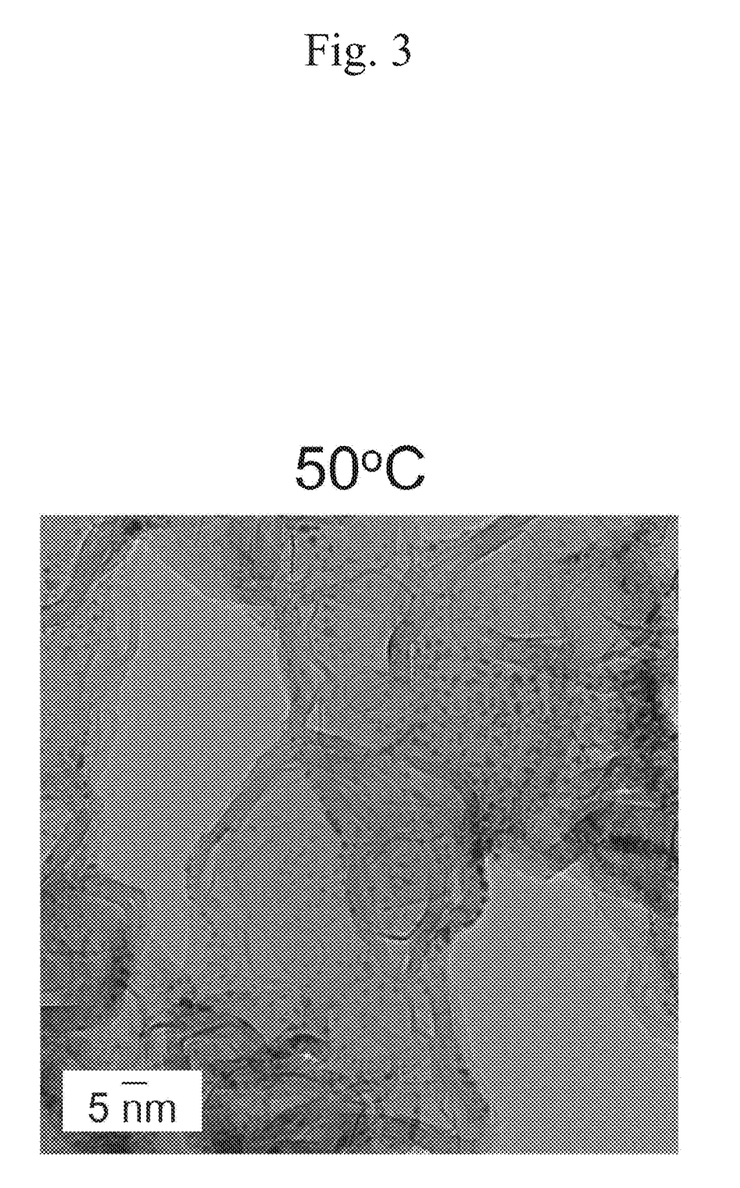
FIG. 3 shows a TEM image of metal nanoparticles synthesized at 50° C.
Figure 4:
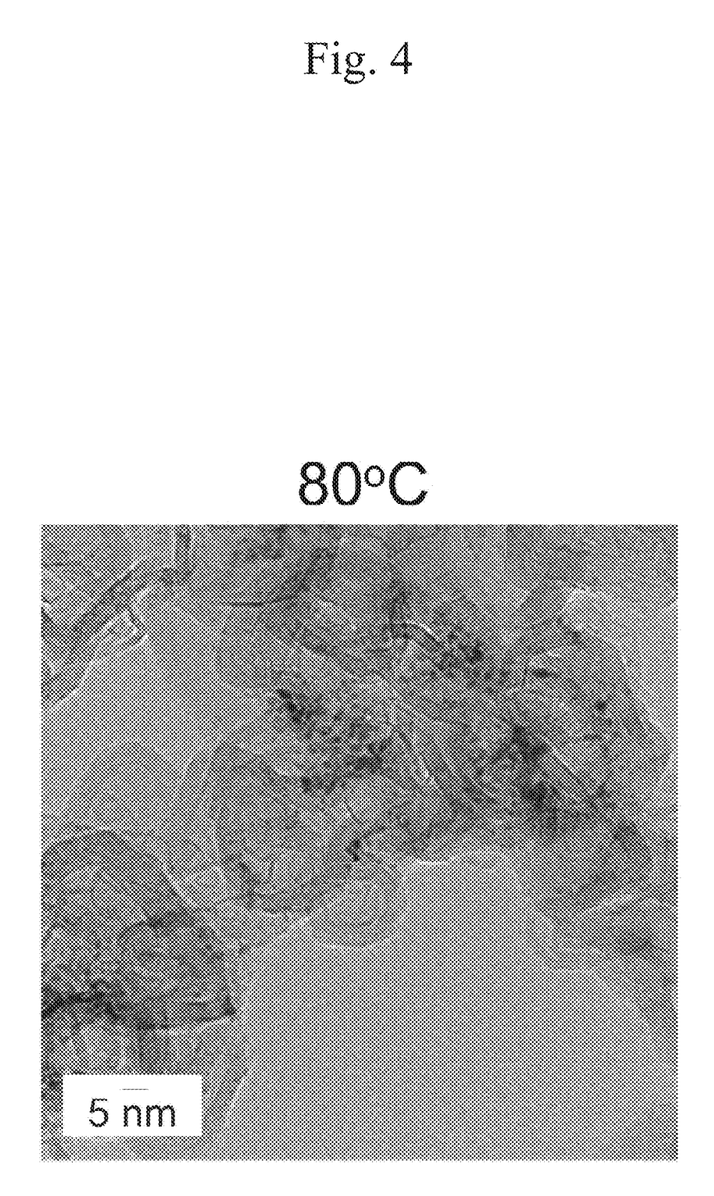
FIG. 4 shows a TEM image of metal nanoparticles synthesized at 80° C.

FIGS. 2 to 4 show TEM images of the metal nanoparticles formed on the sheet 5 kept warm at the respective temperatures. Under all conditions, metal nanoparticles (Pt particles) observed as black spots were formed on the carbon surface regardless of the temperature. All the metal nanoparticles were 2 nm to 5 nm in size.

From the fact that the metal nanoparticles are formed independently of the temperature of the sheet 5, the metal nanoparticles are thought to be formed as follows. That is, it is considered that the mixed liquid (ink) scattered in a sprayed state becomes dry before sticking to the sheet 5, and at this time, the metal salt is reduced by alcohol to form metal nanoparticles. Thereafter, the formed metal nanoparticles may stick to the sheet 5. In other words, the metal nanoparticles may be formed in an atmospheric gas rather than being formed on the sheet 5.

2. Experiment 2

Figure 5:
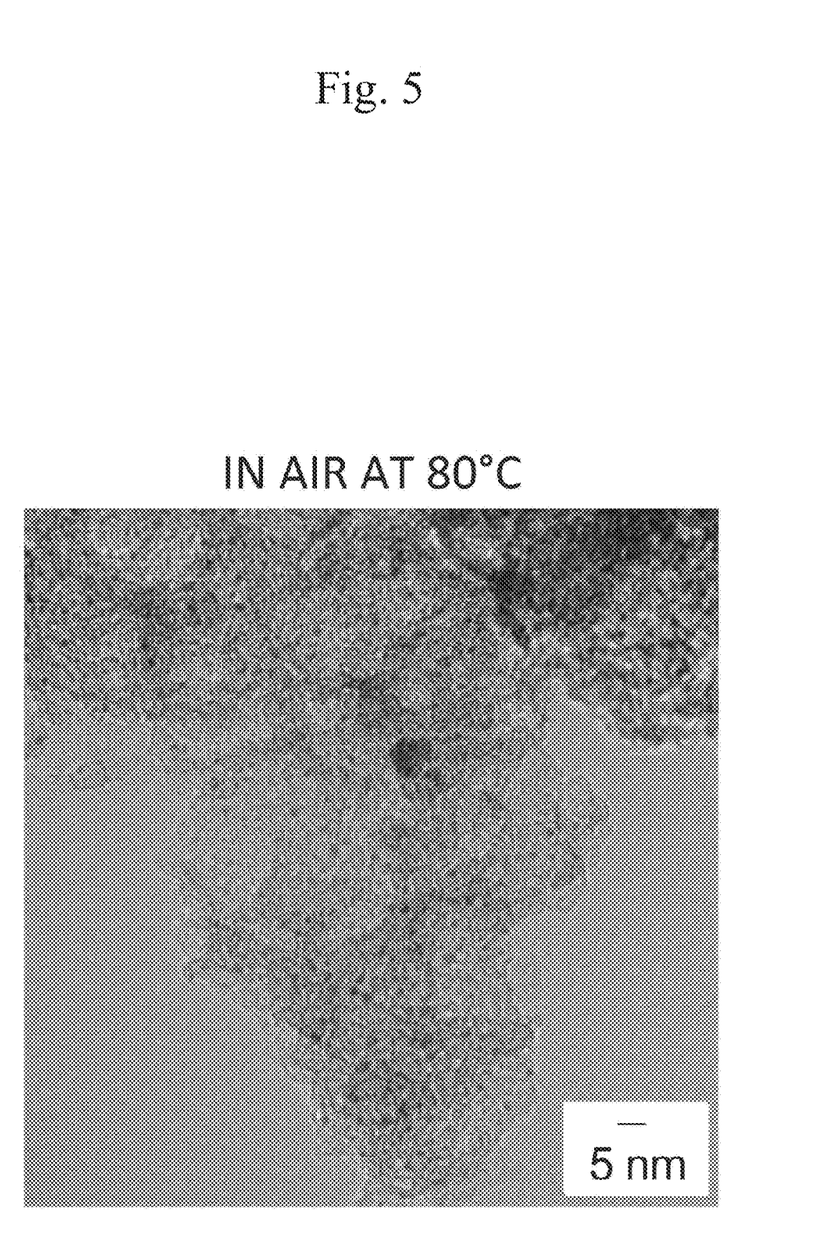
FIG. 5 shows a TEM image of metal nanoparticles synthesized in air.
Figure 6:
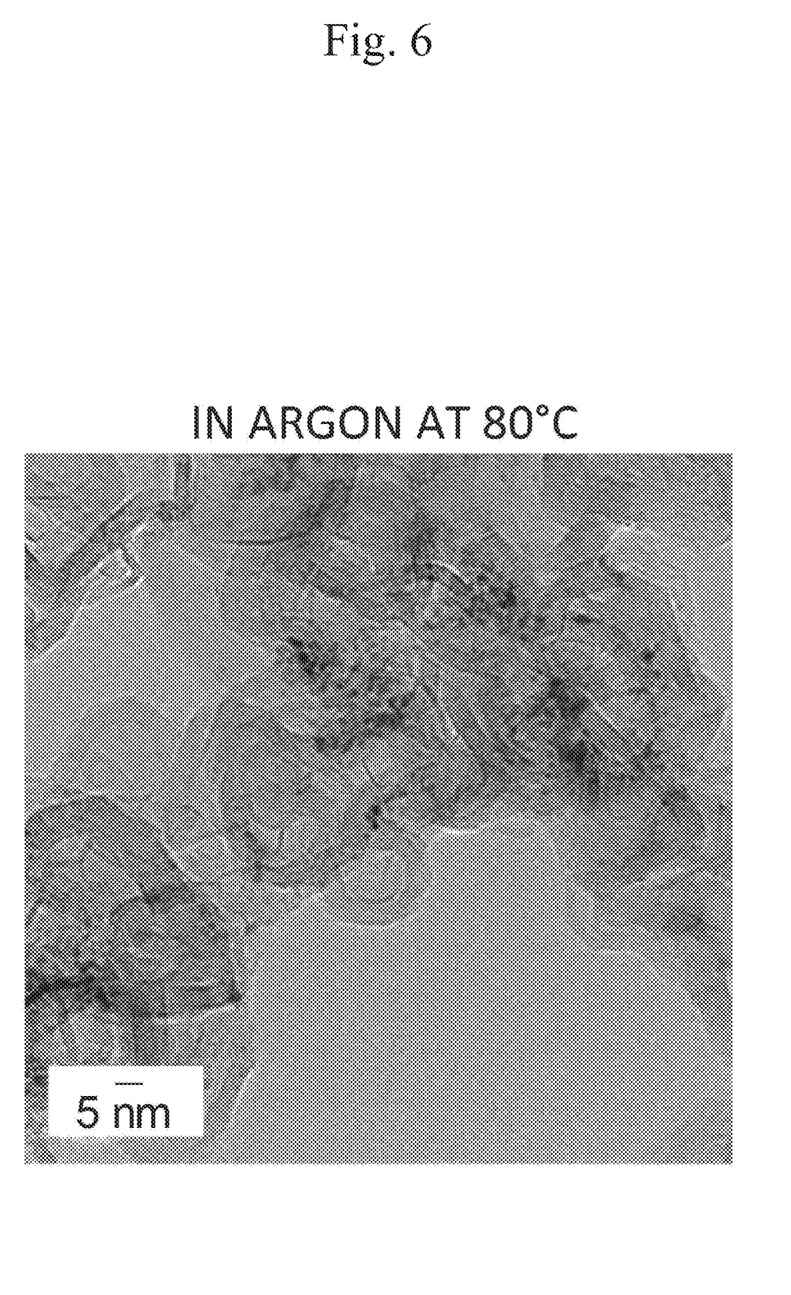
FIG. 6 shows a TEM image of metal nanoparticles synthesized in argon.

In Experiment 2, the effect of the gas atmosphere inside the glove box during spraying was examined. A mixed liquid similar to that in Experiment 1 was prepared. Using the same production apparatus as in Experiment 1, the sheet 5 was heated to 80° C. Experiments were conducted on two types of glove box atmospheric gases: air and argon. FIGS. 5 and 6 show the results. From FIG. 5, it was found that when the atmospheric gas was air, metal nanoparticles were formed, but carbon was burned due to their catalytic action, so that corrosion occurred. On the other hand, from FIG. 6, it was found that when the atmospheric gas was argon, the graphene layer of carbon was clearly observed and maintained the original state, so that metal nanoparticles were formed and supported while carbon was not burned. These results showed that it was desirable to carry out the production method in an inert gas atmosphere. That is, it was found that when the production method was carried out in a gas atmosphere containing oxygen in an amount of 0 ppm or more and 50000 ppm or less, it was possible to suppress oxidation reaction of a support such as carbon. In particular, when the metal nanoparticles are noble metal particles such as Pt particles as in this experiment, these particles act as a catalyst to accelerate oxidation reaction, and therefore it is preferable to carry out the method in a gas atmosphere containing oxygen in an amount of 0 ppm or more and 50000 ppm or less.

3. Experiment 3

Figure 7:
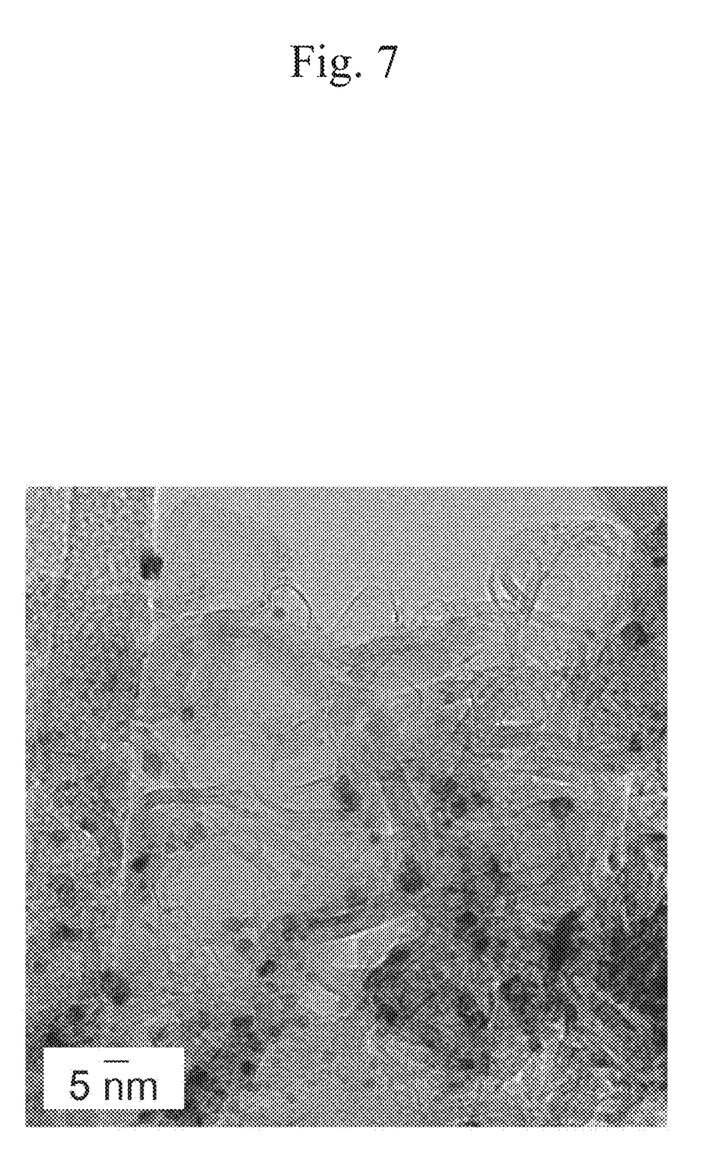
FIG. 7 shows a TEM image of metal nanoparticles synthesized at room temperature and heat-treated (200° C.)
Figure 8:
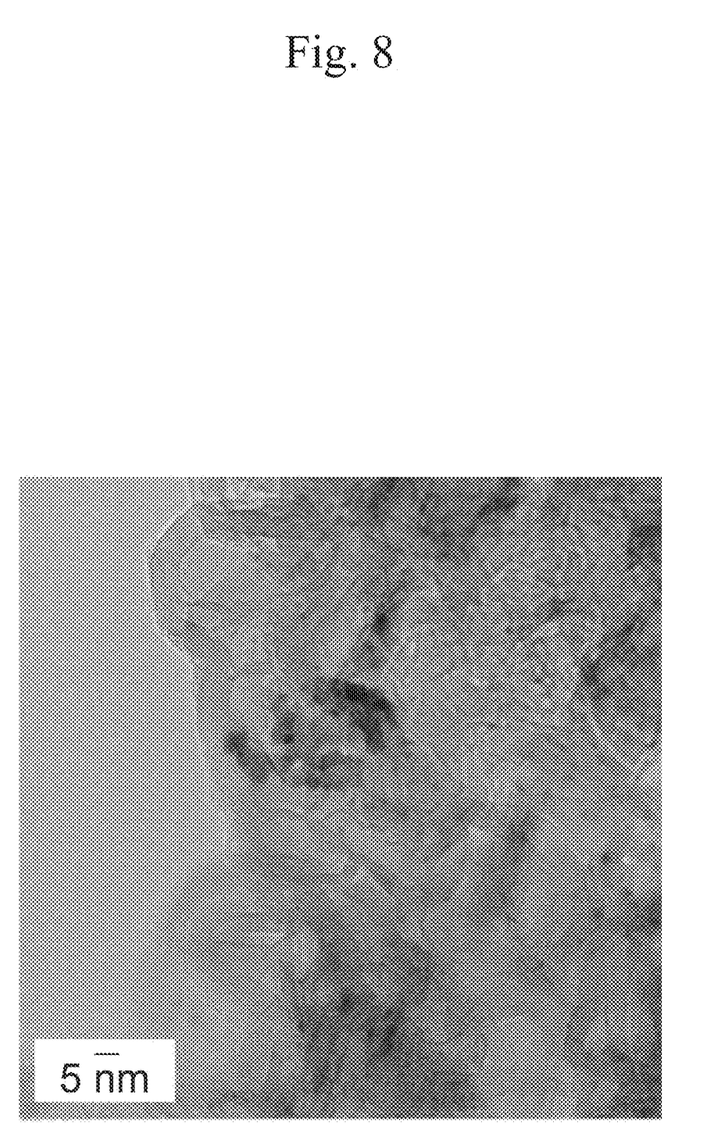
FIG. 8 shows a TEM image of metal nanoparticles synthesized at 50° C. and heat-treated (200° C.)
Figure 9:
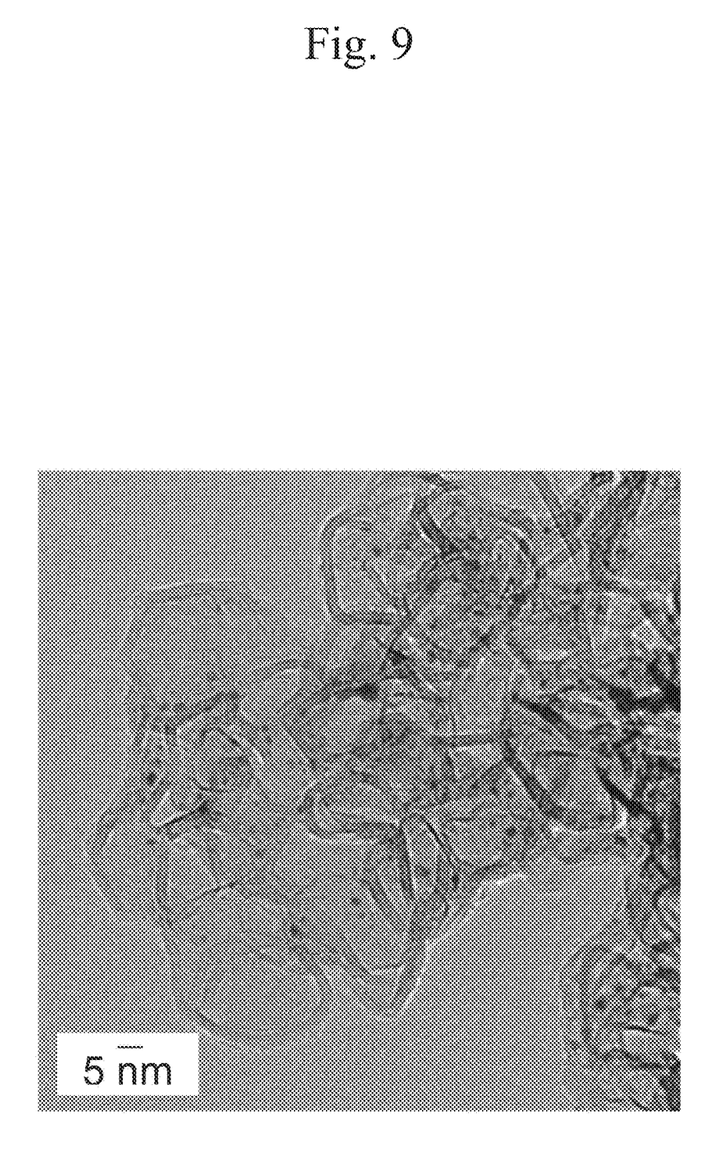
FIG. 9 shows a TEM image of metal nanoparticles synthesized at 80° C. and heat-treated (200° C.)

The following experiments were conducted to show that the production method did not require special heat treatment. The metal nanoparticles obtained in Experiment 1 was heat-treated in a tube-like furnace (Ar atmosphere, 200° C., 2 hours). FIG. 7 shows a TEM image of metal nanoparticles synthesized at room temperature after heat treatment (200° C.). FIG. 8 shows a TEM image of metal nanoparticles synthesized at 50° C. and heat-treated (200° C.) FIG. 9 shows a TEM image of metal nanoparticles synthesized at 80° C. and heat-treated (200° C.). In each case, the shape of the metal nanoparticles is maintained, and there is no significant change. In the prior art, heat treatment at 150° C. or higher reduced a metal salt to form particles, but the production method of the embodiment enabled formation of metal nanoparticles regardless of whether heat treatment was performed or not.

The foregoing examples are intended to merely explain the present invention, and should not be construed as limiting the present invention. While the present invention has been described with exemplary embodiments shown as an example, the language used in the description and illustration of the present invention is understood to be explanatory and illustrative rather than being limiting. As described in detail herein, changes can be made within the appended claims, without departing from the scope or spirit of the present invention in its form. While specific structures, materials and examples have been referred to herein for describing the present invention in detail, the present invention is not intended to be limited to the disclosure herein, but rather the present invention should be construed include all of structures, methods and use functionally equivalent to those in the appended claims.

The present invention is not limited to the embodiments described in detail above, and various modifications and changes can be made within the scope of the claims of the present invention.

The invention claimed is:

1. A method for producing metal nanoparticles, the method comprising:
spraying and drying a mixture to form metal nanoparticles, the mixture containing a metal salt and at least one solvent selected from alcohols having 1 or more and 5 or less carbon atoms;
wherein the metal salt is at least one selected from hexachloroplatinic (IV) acid hexahydrate ($H_2PtCl_6 \cdot 6H_2O$), tetraamminedichloroplatinum, and platinum bromide (IV) ($PtBr_4$),
wherein the atmospheric temperature during spraying is 10° C. or higher and 80° C. or lower,
wherein the concentration of the metal salt is 0.1 mol·$L^{-1}$ or more and 50 mol·$L^{-1}$ or less, and
wherein the metal nanoparticles have an average particle diameter of 0.7 nm or more and less than 2 nm.

2. The method for producing metal nanoparticles according to claim 1, wherein the mixture further contains a support.

3. The method for producing metal nanoparticles according to claim 1, wherein the metal salt is reduced during drying of the mixture.

4. The method for producing metal nanoparticles according to claim 2, wherein the metal salt is reduced during drying of the mixture.

5. The method for producing metal nanoparticles according to claim 1, wherein the metal nanoparticles are produced in a gas atmosphere containing oxygen in an amount of 0 ppm or more and 50000 ppm or less.

6. The method for producing metal nanoparticles according to claim 2, wherein the metal nanoparticles are produced in a gas atmosphere containing oxygen in an amount of 0 ppm or more and 50000 ppm or less.

7. The method for producing metal nanoparticles according to claim 3, wherein the metal nanoparticles are produced in a gas atmosphere containing oxygen in an amount of 0 ppm or more and 50000 ppm or less.

8. The method for producing metal nanoparticles according to claim 4, wherein the metal nanoparticles are produced in a gas atmosphere containing oxygen in an amount of 0 ppm or more and 50000 ppm or less.

9. A method for producing metal nanoparticles, the method comprising:
forming a mixture by mixing a metal salt with at least one solvent selected from alcohols having 1 or more and 5 or less carbon atoms; and
spraying the mixture,
wherein the mixture in the form of mist is dried, and the metal salt is reduced to form metal nanoparticles, and
wherein the metal salt is at least one selected from hexachloroplatinic (IV) acid hexahydrate ($H_2PtCl_6 \cdot 6H_2O$), tetraamminedichloroplatinum, and platinum bromide (IV) ($PtBr_4$),
wherein the atmospheric temperature during spraying is 10° C. or higher and 80° C. or lower,
wherein the concentration of the metal salt is 0.1 mol·$L^{-1}$ or more and 50 mol·$L^{-1}$ or less, and
wherein the metal nanoparticles have an average particle diameter of 0.7 nm or more and less than 2 nm.

10. A method for producing a membrane electrode assembly having a polymer electrolyte membrane and an electrode, the method comprising:
forming the electrode containing the metal nanoparticles on a surface of the polymer electrolyte membrane by spraying a mixture of a metal salt, at least one solvent selected from alcohols having 1 or more and 5 or less carbon atoms, and a support to the polymer electrolyte membrane and drying the mixture to form the metal nanoparticles,
wherein the metal salt is at least one selected from hexachloroplatinic (IV) acid hexahydrate ($H_2PtCl_6 \cdot 6H_2O$), tetraamminedichloroplatinum, and platinum bromide (IV) ($PtBr_4$), wherein the atmospheric temperature during spraying is 10° C. or higher and 80° C. or lower,
wherein the concentration of the metal salt is 0.1 mol·L$^{-1}$ or more and 50 mol·L$^{-1}$ or less, and
wherein the metal nanoparticles have an average particle diameter of 0.7 nm or more and less than 2 nm.

11. A method for producing a polymer electrolyte fuel cell including a membrane electrode assembly having a polymer electrolyte membrane and an electrode, the method comprising:
    forming the electrode containing metal nanoparticles on a surface of the polymer electrolyte membrane by spraying a mixture of a metal salt, at least one solvent selected from alcohols having 1 or more and 5 or less carbon atoms, and a support to the polymer electrolyte membrane and drying the mixture to form the metal nanoparticles,
    wherein the metal salt is at least one selected from hexachloroplatinic (IV) acid hexahydrate (H$_2$PtCl$_6$·6H$_2$O), tetraamminedichloroplatinum, and platinum bromide (IV) (PtBr$_4$),
    wherein the atmospheric temperature during spraying is 10° C. or higher and 80° C. or lower,
    wherein the concentration of the metal salt is 0.1 mol·L$^{-1}$ or more and 50 mol·L$^{-1}$ or less, and
    wherein the metal nanoparticles have an average particle diameter of 0.7 nm or more and less than 2 nm.

* * * * *